United States Patent [19]
Cohen

[11] 4,114,914
[45] Sep. 19, 1978

[54] FOLDABLE MULTI-PURPOSE CART

[76] Inventor: Teddy Cohen, 1493 Crown St., Wantagh, N.Y. 11793

[21] Appl. No.: 829,399

[22] Filed: Aug. 31, 1977

[51] Int. Cl.² .............................................. B62B 11/00
[52] U.S. Cl. ........................................ 280/30; 280/651
[58] Field of Search ............. 280/651, 639, 652, 79.2, 280/79.1 R, 30

[56] References Cited

U.S. PATENT DOCUMENTS

| | | | |
|---|---|---|---|
| 1,582,045 | 4/1926 | Howe | 280/79.1 R |
| 2,789,829 | 4/1957 | Parker | 280/652 |
| 2,840,142 | 6/1958 | Hang | 280/30 |
| 2,967,058 | 1/1961 | Hoffmann | 280/30 |
| 3,222,100 | 12/1965 | Lindzy | 280/652 |
| 3,305,243 | 2/1967 | Manfredi | 280/651 |
| 3,580,592 | 5/1971 | Schrecengost | 280/651 |
| 3,693,993 | 9/1972 | Mazzarelli | 280/30 |
| 3,860,254 | 1/1975 | Wegener | 280/652 |

*Primary Examiner*—Robert R. Song
*Attorney, Agent, or Firm*—C. Bruce Hamburg

[57] ABSTRACT

A foldable multi-purpose cart is provided in which two rectangular frames on which webbing is supported are hingedly connected together. The hinge means include means for locking the hinge means when the cart is fully opened with the frames being angularly displaced from each other by about 180°. Two respective pairs of wheels are rotatably mounted at the corners of the respective frames remote from the hinged connection of the frames. One of the frames is sufficiently smaller than the other in the dimension normal to the hinging axis to permit the frames to be folded together, without mutual interference of the respective pairs of wheels, into superposed relationship by relative rotation of the frames toward each other. A shaft and handle are provided for pulling the cart, with means hingedly operatively connecting the shaft to one of the frames at a point between the pair of wheels mounted on the frame, the hinged connection means including means forming a pivotal axis for the shaft substantially parallel to the axis of the wheels for permitting the shaft to be pivoted into superposed relationship with the frame to which it is connected for compact storage of the cart or to be pivoted so that the shaft and handle extend beyond the frame for convenient pulling of the cart.

5 Claims, 7 Drawing Figures

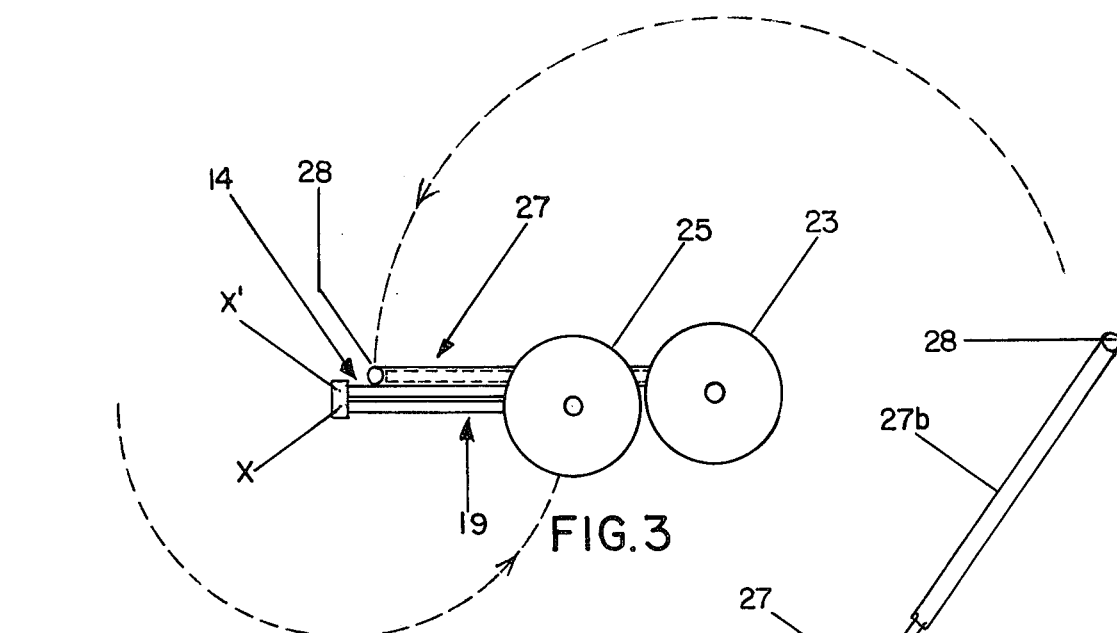
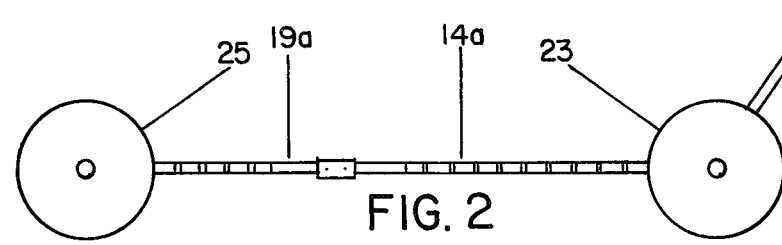
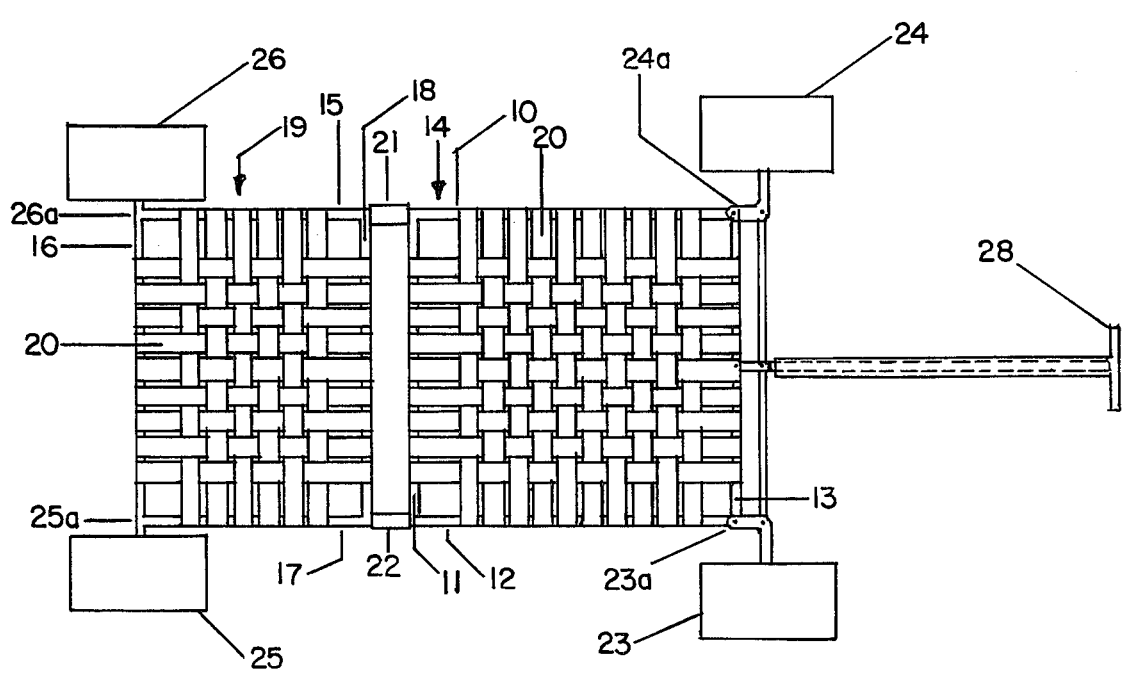

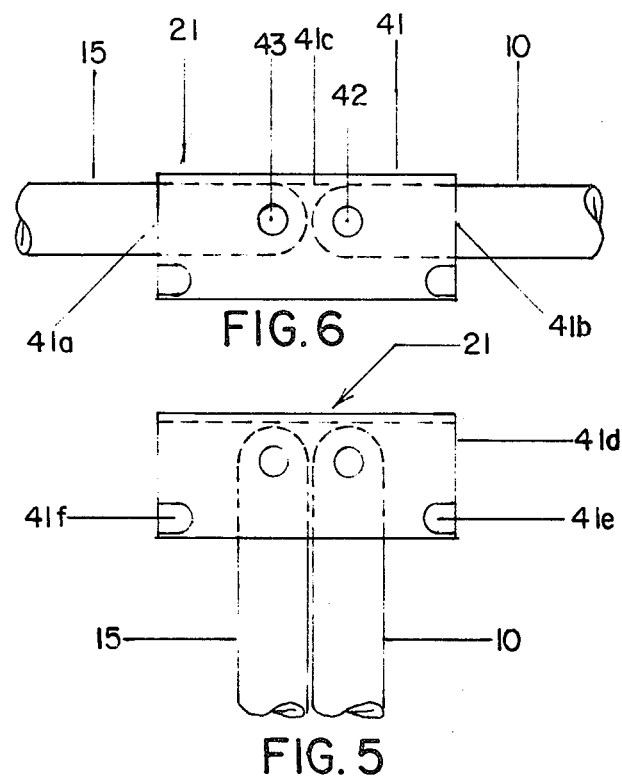
FIG. 6
FIG. 5
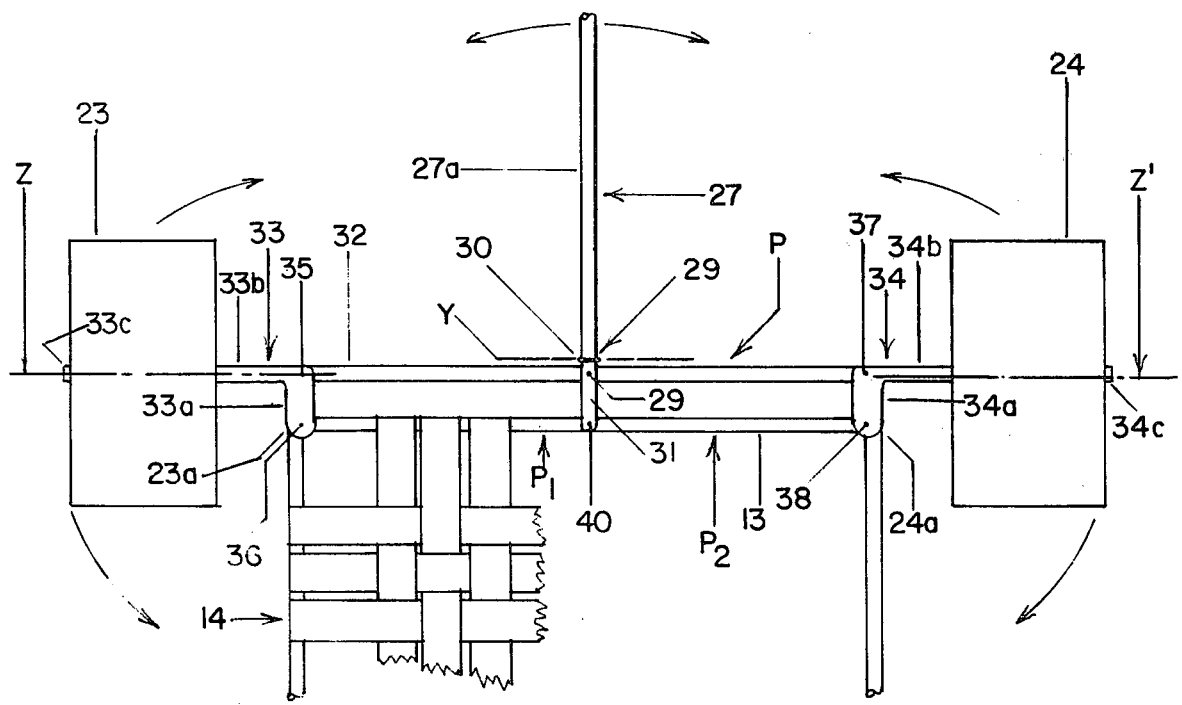
FIG. 4

FOLDABLE MULTI-PURPOSE CART

BACKGROUND OF THE INVENTION

This invention relates to a foldable multi-purpose cart. More particularly, this invention relates to a foldable cart which is particularly useful for carting sundries, such as beach chairs, blankets, freezer chests and the like onto a beach, which is also useful for other carting purposes and which, in some instances, may be suitable for conversion into a lounging chair particularly suitable for the beach.

Various foldable and collapsible carts, some particularly intended for use on a beach and some intended for conversion to other uses, such as a lounge chair, have been proposed in the prior art. As exemplary of these, there may be mentioned U.S. Pat. No. 3,693,993 (Mazzarelli et al.), 3,305,243 (Manfredi et al.), 2,840,142 (Haug), 2,967,058 (Hoffman), 3,860,254 (Wegener), 2,789,829 (Parker), 3,222,100 (Lindzy), and 3,197,223 (Dickerson et al.).

The Mazzarelli et al. construction is disadvantageous and distinguishable from the hereinafter described construction of the present invention for a number of reasons, including the fact that the person using the cart must support some of the load since only one of the frames is provided with a wheel, and the wheel would interfere with the legs of the person attempting to use the device as a lounging chair. In Hoffmann, too, the user must support part of the load because a single wheel only at one end is provided. Moreover, when one attempts to use this device as a chair, it is apparent that one's legs are not supported by this construction and that one is, in essence, sitting in the sand. Since Wegener's foldable packer also employs a single wheel, the user, particularly when there is only a single user, rather than two, must help support the load. The same comment applies to the Parker construction, in which only a single pair of wheels is provided and which construction, moreover, is not adapted for conversion to a chair. The Lindzy personnel or game carrier again suffers from the disadvantage of having only a single pair of wheels, requiring the user to support a part of the load. It is not convertible to a lounging chair and, moreover, appears to be exceedingly complicated in construction. The Manfredi cart is of tricycle construction, which would probably not be of adequate stability for use on a sandy beach. Moreover, the Manfredi cart is not convertible to a lounge chair. Haug's beach cart is convertible to a lounge chair. As a beach cart, however, it is very dissimilar from the cart of the present invention, being quite similar to a standard shopping cart, with respect to which the user supports a substantial portion of the load when pulling the cart. The Dickerson cart is another tricycle arrangement and, consequently, probably not of adequate stability for a sandy beach surface. Moreover, the cart will not convert to a lounge chair. Finally, it should be noted that the aforementioned distinctions between the present invention and the prior art are not necessarily a comprehensive listing and other significant distinctions between the present invention and the prior art will be apparent to any observer by a simple side by side comparison.

It is an object of the invention to provide a foldable, multi-purpose cart which is particularly useful for carting sundries, such as beach chairs, blankets, freezer chests and the like onto a beach, which is also useful for other carting purposes and which, in some instances, may be suitable for conversion into a lounging chair particularly suitable for the beach and which, moreover, does not have the disadvantages characteristic of prior art foldable, multi-purpose carts. Other objects and advantages of the invention will be apparent from the following description thereof.

SUMMARY OF THE INVENTION

According to the invention, there is provided a foldable, multi-purpose cart comprising elongated members forming a pair of rectangular frames, webbing supported by each of the frames to define respective, substantially planar support surfaces bounded by the respective frames, lockable hinge means hingedly connecting the respective frames together, two respective pairs of wheels rotatably mounted at the corners of the respective frames remote from the hinge connection of the frames, and a shaft and handle for pulling the cart. The hinge means includes means for locking the hinge means when the cart is fully open with the frames being angularly displaced from each other by about 180°. One of the frames is sufficiently smaller than the other in the dimension normal to the hinging axis to permit the frames to be folded together, without mutual interference of the respective pairs of wheels, into superposed relationship by relative rotation of the frames toward each other by about 180° around the hinging axis from the locked, fully open configuration. The shaft and handle for pulling the cart are connected to the rest of the cart by means hingedly operatively connecting the shaft to one of the frames at a point between the pair of wheels mounted on the frame. The hinged connection means includes means forming a pivotal axis for the shaft substantially parallel to the axis of the wheels for permitting the shaft to be pivoted into superposed relationship with the frame to which it is connected for compact storage of the cart or to be pivoted so that the shaft and handle extend beyond the frame for convenient pulling of the cart.

The cart preferably further comprises a steering mechanism in the form of a jointed parallelogram. A first side of the parallelogram is constituted of one of the elongated members of one of the frames, this elongated member defining one side of the corners to which the wheels which are steered by the steering mechanism are connected. A second side of the parallelogram is an elongated member parallel to the first side of the parallogram and spaced away from the frame. The third and fourth sides of the parallogram are members respectively on which the respective wheels are mounted for rotation about an axis normal to the third and fourth sides of the parallelogram. The steering mechanism preferably further comprises a member jointedly connecting the members defining the first and second sides of the parallelogram approximately at the mid-points of the first and second sides, thereby to divide the jointed parallelogram into a pair of jointed parallelograms sharing a common side formed by the connecting member. It is particularly desirable that the shaft of the aforementioned handle and shaft be pivotally connected to the connecting member for pivoting about an axis parallel to the axis of the steered wheels.

The aforementioned lockable hinge means may comprise a channel-shaped member having two open ends. Respective means pivotally connect a respective elongated member of each of the frames to the channel-shaped member for pivoting into and out of the channel of the channel-shaped member. The channel has a base acting as a stop for preventing each of the elongated members from being pivoted past an orientation in alignment with the channel. The channel-shaped member has side walls at substantially right angles to the base. The base and side walls of the channel-shaped member are of sufficiently thin cross-section to permit the channel to resiliently temporarily widen upon the application of outwardly directed forces to the side walls. The channel has a normal, unstressed width slightly greater than the thickness of the elongated members pivotally connected thereto. Respective protuberances defining camming surfaces are formed on at least one of the walls for engagement with the respective elongated members pivotally connected to the channel. The protuberances constrict the width of the space through which the respective pivotally connected elongated members must pass just prior to becoming aligned with the channel. Engagement of the elongated members with the camming surfaces in either pivotal direction sufficiently resiliently opens the channel to permit the respective elongated member to pass the protuberance, whereupon the channel returns to its unstressed width. The protuberances thereby releasably lock the elongated members in place when the elongated members are pivoted into the channel and release the elongated members as the elongated members are pivoted out of the channel.

BRIEF DESCRIPTION OF THE DRAWINGS

FIG. 1 is a plan view of a cart according to the invention, the cart being unfolded, and the shaft and handle being extended in front thereof for pulling of the cart;

FIG. 2 is a side elevation of the cart of FIG. 1;

FIG. 3 is a side elevation of the cart of FIGS. 1 and 2 but now shown in a folded condition;

FIG. 4 is an enlarged plan view of the front portion and, especially, the steering mechanism of the aforementioned cart;

FIGS. 5 and 6 are side elevations showing lockable hinge means of the aforementioned cart in respective closed, unlocked and open, locked positions.

DETAILED DESCRIPTION OF A PREFERRED EMBODIMENT

Figure 7:
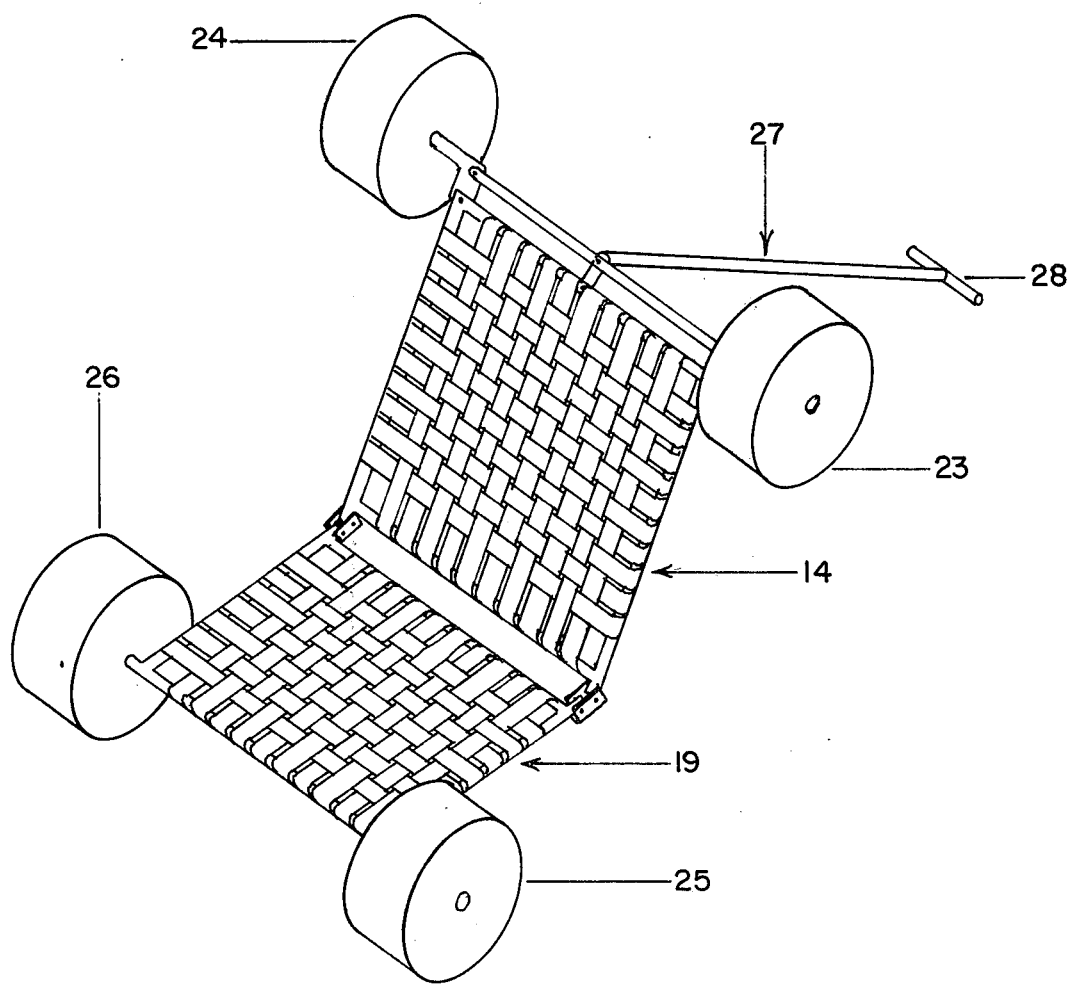
FIG. 7 is an isometric view of the aforementioned cart showing the same now arranged for use as a lounge chair.

The cart is constituted of elongated members, such as of aluminum or chromed steel tubing, 10, 11, 12 and 13 forming a rigid rectangular frame 14, and 15, 16, 17 and 18 forming a rigid rectangular frame 19. The term "rectangular" is intended to be inclusive of rectangles having four sides of equal length, i.e., squares. Webbing 20, such as conventional nylon webbing frequently used for folding, outdoor chairs, is supported by each of the frames 14 and 19, to define respective substantially planar support surfaces 14a and 19a, bounded by the respective frames (FIGS. 1 and 2). The webbing is tensioned across the respective frames, 14 and 19, in a basket weave, the ends of the webbing being fastened to the elongated members constituting the frame by conventional fasteners (not illustrated).

Lockable hinge means 21 and 22 hingedly connect the respective frames 14 and 19 together. Each of the hinge means 21 and 22 includes means for locking the hinge means when the cart is fully open with the frames being angularly displaced from each other by about 180° (FIGS. 1, 2 and 6). Two respective pairs of wheels, 23, 24 and 25, 26 are rotatably mounted at the corners 23a, 24a and 25a, 26a of the respective frames 14 and 19 remote from the hinged connection of the frames 14 and 19. One of the frames 14 is sufficiently smaller than the other frame 19 in the dimension normal to the hinging axis to permit the frames 14 and 19 to be folded together without mutual interference of the respective pairs of wheels 23,24 and 25,26 into superposed relationship by relative rotation of the frames toward each other by about 180° around the hinging axis or, more precisely, hinging axes, X and X' (FIG. 3) from the locked, fully opened configuration.

A shaft 27 and handle 28 are provided for pulling the cart. If desired, the shaft may be of telescoping configuration and have male 27a and female 27b portions, the handle 28 being integral with the female portion 27b. It is a simple matter to provide sufficient frictional engagement between the male member 27a and the female member 27b so that the shaft 27 will remain in its extended position, on the one hand, and can be readily collapsible by the application of firm manual pressure, on the other hand. In accordance with conventional techniques, an outwardly extending flanged or flared may be provided at the end of the male member 27a received in the female member 27b and an inwardly directed flange may be provided at the end of the female member 27b receiving the male member 27a, thereby to prevent the shaft from becoming disassembled into its two component parts when the cart is being pulled. Such details of the construction are conventional for telescoping shafts and are not illustrated here in detail.

The shaft 27 is hingedly operatively connected to the frame 14 by a hinged connection means 29 (FIG. 4). The shaft 27 is operatively connected rather than directly connected to the frame 14 because interposed between the hinge connection 29 and the frame 14 is a steering mechanism which will subsequently be described. The operative connection of the shaft 27 to the frame 14 is at a point between, preferably midway between, the pair of wheels 23, 24 mounted on the frame 14. The hinged connection means includes means forming a pivotal axis Y for the shaft 27 substantially parallel to the axis, more precisely, the respective axes Z and Z' of the wheels 23, 24. The hinged connection means may be, for example, simply a pivot 30 passing through respective holes (not illustrated) in the shaft member 27a and a member 31 of the steering mechanism to which the shaft member 27a is connected by means of the hinged connection means. This permits the shaft 27 to be pivoted into superposed relationship with the frame 14 for compact storage of the cart (FIG. 3). This arrangement likewise permits the shaft 27 to assume whatever angle relative to the cart is comfortable for a person pulling the cart when the shaft is inclined forwardly of the cart as illustrated in FIGS. 1 and 2. This also permits the shaft 27 to be adjusted to an angle suitable for supporting a portion of the cart when the cart is converted to a lounge chair, as illustrated in FIG. 7 and as will be described hereafter in greater detail.

The steering mechanism of the invention, like the rest of the rigid construction of the cart, may be fabricated of conventional materials such as tubular aluminum or chromed steel. The steering mechanism comprises a jointed parallelogram P. A first side of the parallelogram is constituted of member 13 of the frame 14, the elongated member 13 defining each of the corners 23a and 24a of the frame 14 to which the steering wheels are connected. A second side of the parallelogram is an elongated member 32 parallel to the first side and spaced away from the frame 14. The third and fourth sides of the parallelogram are constituted of respective legs 33a, 34a of respective right-angled members 33, 34 onto the respective other arms 33b, 34b of which the respective wheels 23, 24 are rotatably mounted. The member 13 is jointedly connected to the free end of the arm 33a by means of a pivot pin 36 and is jointly connected to the free end of the arm 34a by means of a pivot pin 38. The member 32 is jointedly connected at one of its ends to the other end of the arm 33a by means of a pivot pin 35 and is jointedly connected at the other of its ends to the other end of the arm 34a by means of a pivot pin 37. The member 31, which divides the jointed parallelogram $P_1$ and $P_2$, is jointedly connected at one of its ends to the mid-point of the member 32 by means of a pivot pin 39 and is jointedly connected at the other end to the mid-point of the member 13 by means of a pivot pin 40. The arms 33b and 34b are of circular cross-section and circular bores (not illustrated) are provided through the respective wheels 23 and 24. The respective bores for the wheels are of slightly greater diameter than the diameter of the arms 33b, 34b whereby the wheels 23 and 24 are rotatably mounted. The respective ends 33c and 34c of the arms 33b and 34b are slightly flared or provided with caps (not illustrated) so that the respective wheels 23 and 24 will not fall off. Obviously, more sophisticated mounting systems, for example employing ball bearings, obvious to one skilled in the art, may be employed. As shown by the arrows in FIG. 4, if one moves the shaft 27 to the right, the parallelograms $P_1$ and $P_2$ are slanted to the right and, consequently, the wheels 23 and 24 are steered to the right. Analogously, shifting of the shaft 27 to the left of an orientation in which it is perpendicular to the member 13 results in leftward steering of the wheels 23 and 24.

In connection with FIGS. 5 and 6, one of the two lockable hinge means hingedly connecting the respective frames together will be described. It is to be understood that the other lockable hinge means is exactly the same. The member 10 of the frame 14 and the member 15 of the frame 19 each extends slightly beyond their respective frames and into a channel-shaped member 41 having two open ends 41a and 41b. Respective pivot pins 42 and 43 pivotally connect the respective elongated members 10 and 15 to the channel-shaped member 41. The channel of the channel-shaped member 41 has a base 41c acting as a stop for preventing each of the elongated members 10 and 15 from being pivoted past an orientation in alignment with the channel. The channel-shaped member 41 also has side walls 41d at substantially right angles to the base. The base 41c and the side walls 41d are of sufficiently thin cross-section to permit the channel to resiliently temporarily widen upon the application of outwardly directed forces to the side walls. The channel has a normal unstressed width slightly greater than the thickness, i.e., diameter in the case of tubular members, of the members 10 and 15. Respective protuberances 41e and 41f defining camming surfaces are formed on the inside of at least one of the walls 41d for engagement with the respective elongated members 10 and 15. The protuberances are conveniently formed by indenting the outer face of the wall 41d. What actually shows in FIGS. 5 and 6 are the indentations, i.e., the reverse sides of the protuberances. The protuberances 41e, 41f constrict the width of the space through which the respective members 10 and 15 must pass just prior to becoming aligned with the channel. Engagement of the respective elongated members 10 and 15 with the respective camming surfaces 41e and 41f in either direction of pivotal movement of the members 10 and 15 sufficiently resiliently opens the channel to permit the respective elongated members 10 and 15 to pass the respective protuberances 41e and 41f, whereupon the channel returns to its unstressed width. The protuberances 41e and 41f thereby releasably lock the elongated members in place when the elongated members are pivoted into the channel (FIG. 6) and release the elongated members as the elongated members are pivoted out of the channel (FIG. 5).

The cart is readily convertible to a beach chair (FIG. 7). The wheels 25, 26 rest on the sand. The frame 19 serves as the seat. The frame 14 serves as the back support. The shaft 27 is tilted downwardly so that the handle 28 rests on the sand, supporting the frame or chair back 14.

While the invention has been described with reference to a specific embodiment thereof, it is to be understood that such description is intended to exemplify rather than to limit the invention and that all modifications and variations within the scope and spirit of the hereto appended claims are intended to be within the scope of the invention.

What is claimed is:

1. A foldable multi-purpose cart comprising elongated members forming a pair of rectangular frames, webbing supported by each of the frames to define respective substantially planar support surfaces bounded by the respective frames, lockable hinge means hingedly connecting the respective frames together, the hinge means including means for locking the hinge means when the cart is fully open with the frames being angularly displaced from each other by about 180°, two respective pairs of wheels rotatably mounted at the corners of the respective frames remote from the hinged connection of the frames, entirely outside the respective perimeters of the respective frames and extending beyond the respective planes of the respective frames, one of the frames being sufficiently smaller than the other in the dimension normal to the hinging axis to permit the frames to be folded together, without mutual interference of the respective pairs of wheels and without interference of the wheels on each frame with the other frame, into superimposed abutting relationship by relative rotation of the frames in a direction of said extension of the wheels toward each other by about 180° around the hinging axis from the locked, fully open configuration, a shaft and handle for pulling the cart, and means hingedly operatively connecting the shaft to one of the frames at a point between the pair of wheels mounted on the frame, the hinged connection means including means forming a pivotal axis for the shaft substantially parallel to the axis of the wheels for permitting the shaft to be pivoted into superposed relationship with the frame to which it is connected for compact storage of the cart or to be pivoted so that the shaft and handle extend beyond the frame for convenient pulling of the cart.

2. A foldable multi-purpose cart comprising elongated members forming a pair of rectangular frames, webbing supported by each of the frames to define respective substantially planar support surfaces bounded by the respective frames, lockable hinge means hingedly connecting the respective frames together, the hinge means including means for locking the hinge means when the cart is fully open with the frames being angularly displaced from each other by about 180°, two respective pairs of wheels rotatably mounted at the corners of the respective frames remote from the hinged connection of the frames, one of the frames being sufficiently smaller than the other in the dimension normal to the hinging axis to permit the frames to be folded together, without mutual interference of the respective pairs of wheels, into superimposed relationship by relative rotation of the frames toward each other by about 180° around the hinging axis from the locked, fully open configuration, a shaft and handle for pulling the cart, means hingedly operatively connecting the shaft to one of the frames at a point between the pair of wheels mounted on the frame, the hinged connection means including means forming a pivotal axis for the shaft substantially parallel to the axis of the wheels for permitting the shaft to be pivoted into superposed relationship with the frame to which it is connected for compact storage of the cart or to be pivoted so that the shaft and handle extend beyond the frame for convenient pulling of the cart, and a steering mechanism in the form of a jointed parallelogram, a first side of the parallelogram being constituted of one of said elongated members of one of the frames, said one elongated member defining one side of the corners to which the wheels are connected, these wheels being steered by the steering mechanism, a second side of the parallelogram being an elongated member parallel to the first side of the parallelogram and spaced away from the frame, the third and fourth sides of the parallelogram being members respectively on which the respective wheels are mounted for rotation about an axis normal to the third and fourth sides of the parallelogram.

3. A cart according to claim 2, in which the steering mechanism further comprises a member jointedly connecting the members defining said first and second sides of the parallelogram approximately at the mid-points of said first and second sides thereby to divide the jointed parallelogram into a pair of jointed parallelograms sharing a common side formed by the connecting member.

4. A cart according to claim 3, in which the shaft of said handle and shaft is pivotally connected to said connecting member for pivoting about an axis parallel to the axis of the steered wheels.

5. A foldable multi-purpose cart comprising elongated members forming a pair of rectangular frames, webbing supported by each of the frames to define respective substantially planar support surfaces bounded by the respective frames, lockable hinge means hingedly connecting the respective frames together, the hinge means including means for locking the hinge means when the cart is fully open with the frames being angularly displaced from each other by about 180°, each of the lockable hinge means comprising a channel-shaped member having two open ends, respective means pivotally connecting a respective elongated member of each of the frames to the channel-shaped member for pivoting into and out of the channel of the channel-shaped member, the channel having a base acting as a stop for preventing each of the elongated members from being pivoted past an orientation in alignment with the channel, the channel-shaped member having side walls at substantially right angles to the base, the base and side walls of the channel-shaped member being of sufficiently thin cross-section to permit the channel to resiliently temporarily widen upon the application of outwardly directed forces to the side walls, the channel having a normal unstressed width slightly greater than the thickness of the elongated members pivotally connected thereto, respective protuberances defining camming surfaces formed on at least one of said walls for engagement with the respective elongated members pivotally connected to the channel, the protuberances constricting the width of the space through which the respective pivotally connected elongated members must pass just prior to becoming aligned with the channel, engagement of the elongated members with the camming surfaces in either pivotal direction sufficiently resiliently opening the channel to permit the respective elongated member to pass the protuberances whereupon the channel returns to its unstressed width, the protuberances thereby releasably locking the elongated members in place when the elongated members are pivoted into the channel and releasing the elongated members as the elongated members are pivoted out of the channel, two respective pairs of wheels rotatably mounted at the corners of the respective frames remote from the hinged connection of the frames, one of the frames being sufficiently smaller than the other in the dimension normal to the hinging axis to permit the frames to be folded together, without mutual interference of the respective pairs of wheels, into superimposed relationship by relative rotation of the frames toward each other by about 180° around the hinging axis from the locked, fully open configuration, a shaft and handle for pulling the cart, and means hingedly operatively connecting the shaft to one of the frames at a point between the pairs of wheels mounted on the frame, the hinged connection means including means forming a pivotal axis for the shaft substantially parallel to the axis of the wheels for permitting the shaft to be pivoted into superposed relationship with the frame to which it is connected for compact storage of the cart or to be pivoted so that the shaft and handle extend beyond the frame for convenient pulling of the cart.

* * * * *